US011017631B2

(12) United States Patent
Zavesky et al.

(10) Patent No.: US 11,017,631 B2
(45) Date of Patent: May 25, 2021

(54) METHOD TO DETECT AND COUNTERACT SUSPICIOUS ACTIVITY IN AN APPLICATION ENVIRONMENT

(71) Applicant: AT&T Intellectual Property I, L.P., Atlanta, GA (US)

(72) Inventors: Eric Zavesky, Austin, TX (US); David Crawford Gibbon, Lincroft, NJ (US); Lee Begeja, Gillette, NJ (US); Paul Triantafyllou, Summit, NJ (US); Bernard S. Renger, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1 day.

(21) Appl. No.: 16/289,187

(22) Filed: Feb. 28, 2019

(65) Prior Publication Data
US 2020/0279455 A1 Sep. 3, 2020

(51) Int. Cl.
*G07F 17/32* (2006.01)
*A63F 13/75* (2014.01)

(52) U.S. Cl.
CPC .......... *G07F 17/3241* (2013.01); *A63F 13/75* (2014.09); *A63F 2300/5586* (2013.01)

(58) Field of Classification Search
None
See application file for complete search history.

(56) References Cited

U.S. PATENT DOCUMENTS

| 7,288,027 B2 | 10/2007 | Overton |
| 7,517,282 B1 | 4/2009 | Pryor |
| 8,312,157 B2 | 11/2012 | Jakobsson et al. |
| 8,370,389 B1 | 2/2013 | Dotan |
| 8,875,267 B1 | 10/2014 | Kolman et al. |
| 8,881,289 B2 | 11/2014 | Basavapatna et al. |
| 9,185,095 B1 | 11/2015 | Moritz et al. |
| 9,205,335 B2 | 12/2015 | Mcdonald et al. |
| 9,305,028 B2 | 4/2016 | Engineer et al. |
| 9,426,137 B2 | 8/2016 | Caceres et al. |
| 9,517,402 B1 | 12/2016 | Vogel |

(Continued)

OTHER PUBLICATIONS

Enabling Two-Factor Authentication, https://docs.bugcrowd.com/docs/two-factor-authentication-1, accessed Jan. 11, 2019, 2 pages.

(Continued)

*Primary Examiner* — James S. McClellan
*Assistant Examiner* — Peter J Iannuzzi
(74) *Attorney, Agent, or Firm* — Guntin & Gust, PLC; Dana Lemoine

(57) ABSTRACT

Aspects of the subject disclosure may include, for example, comparing an input received from a peripheral device associated with an execution of a gaming application with a threshold value, wherein the threshold value is based on a first identification of a first user, a second identification of the peripheral device, and a third identification of stimuli presented as part of the execution of the gaming application. Responsive to the comparing, a determination may be made that the input exceeds the threshold value. Responsive to the determination, a validation request may be transmitted to a user device of the first user. Other embodiments are disclosed.

20 Claims, 9 Drawing Sheets

(56) References Cited

U.S. PATENT DOCUMENTS

| | | | |
|---|---|---|---|
| 2008/0305869 A1 | 12/2008 | Konforty et al. | |
| 2009/0300720 A1* | 12/2009 | Guo | H04L 51/12 726/3 |
| 2013/0239191 A1 | 9/2013 | Bostick | |
| 2017/0032114 A1* | 2/2017 | Turgeman | H04W 12/06 |
| 2019/0253504 A1* | 8/2019 | Wang | H04L 67/22 |

OTHER PUBLICATIONS

Pan-tilt-zoom-camera, https://en.wikipedia.org/wiki/Pan%E2%80%93tilt%E2%80%93zoom_camera, accessed Jan. 11, 2019 2 pages.
Billy Mitchell, https://en.m.wikipedia.org/wiki/Billy_Mitchell, accessed Jan. 10, 2019, 8 pages.

* cited by examiner

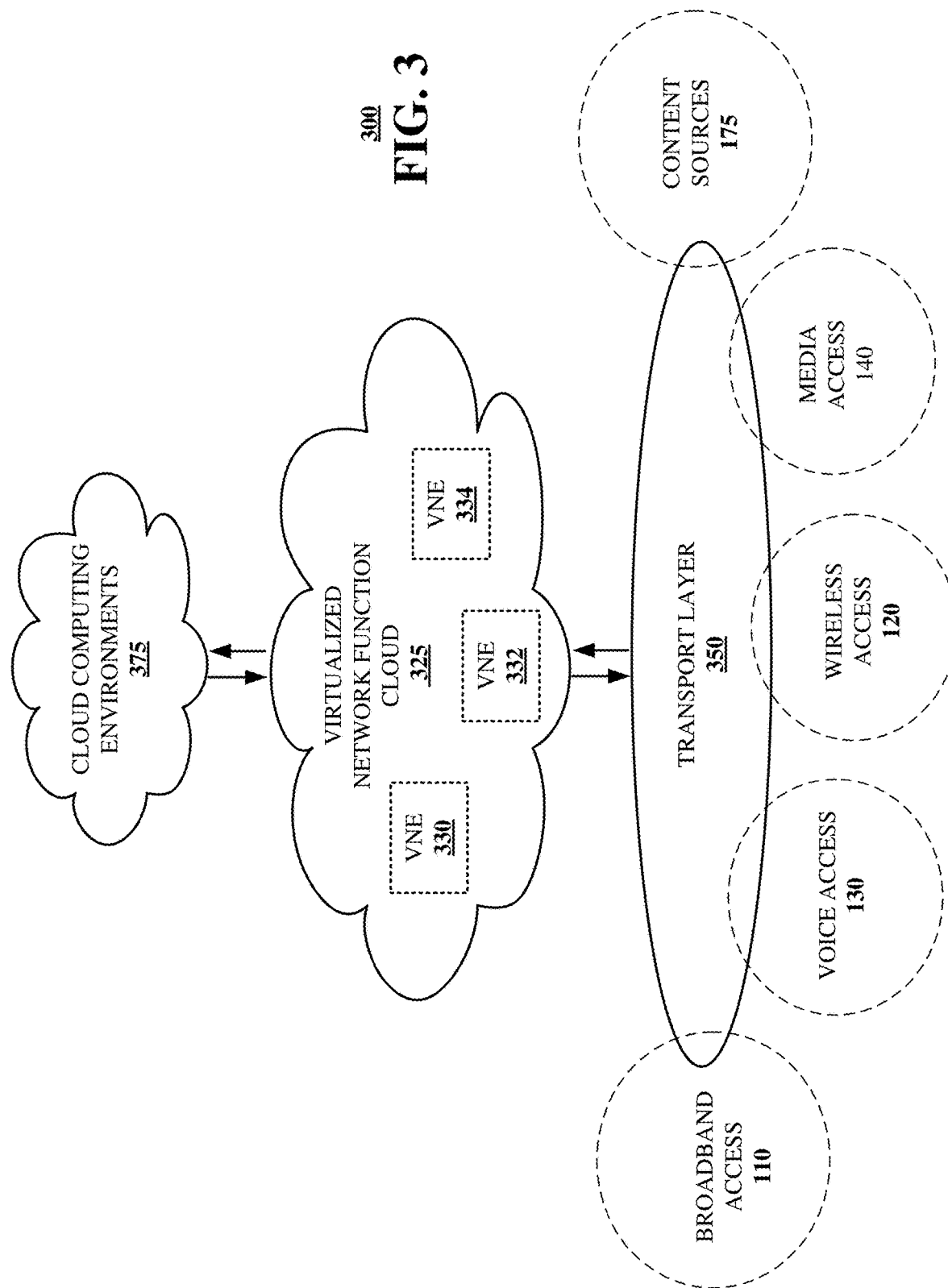

METHOD TO DETECT AND COUNTERACT SUSPICIOUS ACTIVITY IN AN APPLICATION ENVIRONMENT

FIELD OF THE DISCLOSURE

The subject disclosure generally relates to a detection of suspicious activity, and more specifically, to a detection and counteraction of player fraud in a gaming environment.

BACKGROUND

The number and extent of environments where humans interact with devices is increasing as the world continues to become more connected. However, technology has failed to keep pace with this increasingly-connected world. For example, in the context of gaming, technology for detecting player fraud and collusion has not kept pace. In large venue scenarios, the proctoring of many players in parallel may miss inputs that are digital in nature (e.g., macros, enhanced keyboard, etc.). In remote player scenarios, the capability for (unauthorized) individuals to stand-in or impersonate other players is growing but detection of such activities is nascent.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for determining or detecting when a user of a device is engaging in potentially suspicious activity. Aspects of the disclosure may be to identify a user that is engaging in an unauthorized activity, such as, for example, cheating, committing fraud, etc. Other embodiments are described in the subject disclosure.

One or more aspects of the subject disclosure include obtaining a first identification of an application and a second identification that comprises an identification of inputs associated with an execution of the application. The second identification may be based on the first identification. In some embodiments, at least one of the inputs is associated with a threshold. The inputs may be monitored during an execution of the application to determine whether the threshold is exceeded. Responsive to determining that the threshold is exceeded, a third identification of a user may be generated and stored. The third identification may be associated with one or more of the inputs and/or stimuli associated with the execution of the application.

One or more aspects of the subject disclosure include establishing a model of an execution of the application. The model may be based on a simulation or trial-run of the application. The model may be based on features related to one or more identified users. In some embodiments, a value for one or more thresholds may be established based on the model.

One or more aspects of the subject disclosure include monitoring an execution of an application for potentially suspicious (e.g., fraudulent) activity. In some embodiments, the application may comprise a game (e.g., a video game). Inputs to the game may be monitored, where the inputs may include actions taken with respect to one or more devices, such as, for example, a console (e.g., a gaming console), a peripheral device, etc.

Figure 1:
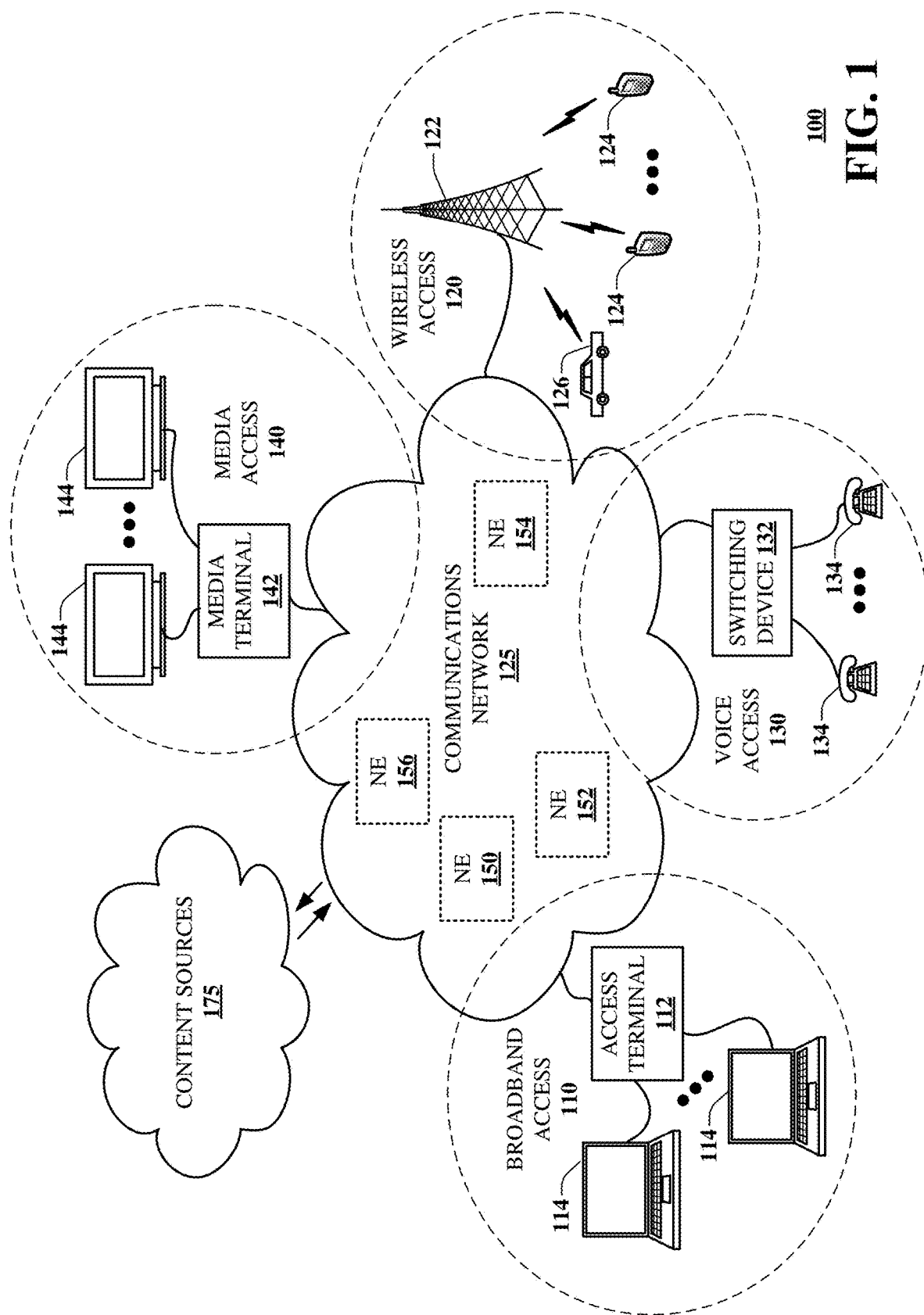
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part obtaining a first identification of an application and a second identification that comprises an identification of inputs associated with an execution of the application. In some embodiments, at least one of the inputs is associated with a threshold. The inputs may be monitored during an execution of the application to determine whether the threshold is exceeded. Responsive to determining that the threshold is exceeded, a user associated with the inputs may be identified. One or more actions may be taken with respect to the identified user as described further below.

As shown in FIG. 1, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
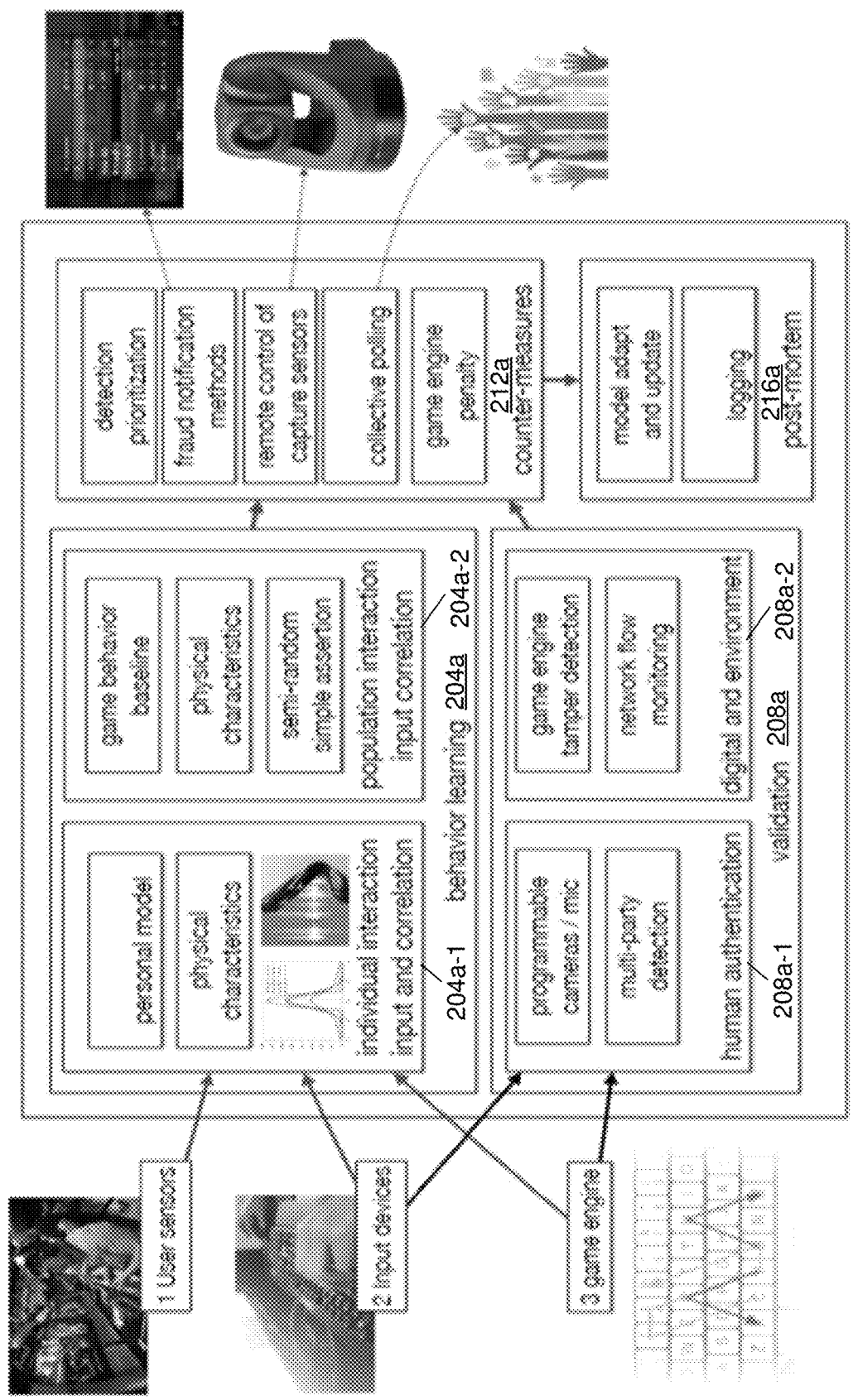
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within the communication network of FIG. 1 in accordance with various aspects described herein. As shown in FIG. 2A, the system 200a may include a behavior learning module 204a, a validation module 208a, a counter-measures module 212a, and a post-mortem module 216a. The modules 204a-216a may be operative in conjunction with one or more devices or components, such as, for example, one or more of the devices or components described herein. In some embodiments, the modules 204a-216a may be operative in connection with one or more user sensors 1, one or more input devices 2, and one or more engines (e.g., game engine 3) as shown in FIG. 2A and as described further below.

The behavior learning module 204a may be used to learn the behaviors of one or more users. For example, in the context of a gaming application, the behavior learning module 204a may be used to generate or obtain a model/profile of one or more user behaviors. Such user behaviors may include an actuation of one or more inputs in connection with one or more devices or components (e.g., a console, a peripheral device, etc.). In some embodiments, the model may be generated or obtained in accordance with a trial-run or simulation of the application.

The behavior learning module 204a may include an individual interaction input and correlation module 204a-1. As shown in FIG. 2A, the module 204a-1 may include a personal model and an identification of physical characteristics.

The personal model of the module 204a-1 may be based on user interactions/behaviors during a trial-run or simulation of an execution of an application. For example, in connection with an execution of a game a user (e.g., a gamer) may be tasked with playing the game a number of times in order to establish a log/history of how the user reacts to various scenarios or situations presented during gameplay by the game engine 3. Such a log/history may establish a user's likely/probabilistic behavioral patterns in response to various stimuli presented during gameplay. The log/history may establish actions that a user may take in response to the stimuli (e.g., actuation of an identified device in response to the stimuli), a response-time to the stimuli (e.g., how long it takes the user to respond to the stimuli once the stimuli is presented), etc. The input devices 2, which may include peripheral devices (e.g., a keyboard, a mouse, a joystick, a remote control, a gamepad, a headset, etc.), may be monitored during the simulation as part of establishing the log/history.

The physical characteristics included with the module 204a-1 may be based on outputs of the sensors 1. For example, a camera may monitor a user's gaze to determine where a user tends to look during game action presented on a display device. A thermometer (or other measurement device) may be used to correlate a user's body temperature to stimuli presented during the simulation/gameplay. A microphone may detect a user's tone in response to the stimuli. Other types of sensors/sensed events may be used/detected in conjunction with the physical characteristics of the module 204a-1.

The behavior learning module 204a may include a population interaction input correlation module 204a-2. The module 204a-2 may be used to assess how a particular user associated/identified in connection with the module 204a-1 responds to stimuli relative to a broader/larger population of users (e.g., gamers). For example, the module 204a-2 may include a model/game behavior baseline as shown in FIG. 2A. The game behavior baseline may include a specification of a model in terms of how users typically react to various stimuli (or combinations of stimuli) presented during gameplay. Similarly, the module 204a-2 may include a physical characteristics (module) that may include a specification of physical/sensed characteristics of a typical user relative to stimuli presented during gameplay.

The personal model of the module 204a-1 may be compared with the game behavior baseline of the module 204a-2 to determine/assess how a user identified in connection with the personal model performs/behaves in terms of responding to stimuli relative to the broader population. Similarly, the physical characteristics of the module 204a-1 may be compared with the physical characteristics of the module 204a-2 to determines/assess how the identified user physical characteristics change/adapt in response to stimuli relative to the broader population. Based on these comparisons, a profile may be established for a user, where the parameters of the profile serve as a signature that uniquely identifies/distinguishes the user from other users.

As shown in FIG. 2A, the module 204*a*-2 may include a semi-random simple assertion module. The semi-random simple assertion module may provide a random prompt to a base of users in order to gauge user responses to that prompt. The prompt may be generated and disseminated/distributed to further clarify/refine one or more models or specifications that may be generated in connection with the behavior learning module 204*a*.

In some embodiments, as part of engaging in one or more simulations the system 200*a* (e.g., a gaming system) may be initialized for typical use (e.g., typical gameplay). For example, a configuration for the system may be obtained. The configuration may include a specification of one or more networks that may be used, an identification of devices (e.g., a gaming console, peripheral devices, etc.) that are used, etc. In the context of a game, cross-game models of related games may be obtained (e.g., imported. The cross-game models may be used as bootstraps for detecting suspicious (e.g., fraudulent) activities/behaviors in connection with an execution/playing of the game as described further below.

As described herein, there are various types of suspicious activities that may be detected in accordance with the system 200*a* (e.g., the behavior learning module 204*a*). For example, a determination may be made that a first user is impersonating a second user (which may be based on teleoperations or an in-person tag-in for alternate players/gamers). A determination may be made that a first user is obtaining unauthorized/illegal assistance from a second user or other third parties (which may be based on a networked or collocated passing of an information request). A determination may be made that a first user is engaged in collusion with one or more other users (which may be based on detecting one or more users working contrary to typical goals of a sub-group, such as, for example, the first user providing a resource to a second user that would otherwise benefit the first user). A determination may be made that a first user is using macros or automated software (e.g., which may be based on detecting actuations (e.g., keystrokes) of input devices at abnormal rates of speed), cheating by a macro, hacked code, or software assistance, or a combination thereof. In some embodiments, a determination may be made that a first user has made changes/alterations to a game code or rules programmatically (which may be based on validation of anti-tampering codes or software).

As part of (actual or simulated) gameplay, the validation module 208*a* may be used to verify/validate that a user allegedly playing in a game is actually the person playing the game. In this respect, the validation module 208*a* may include a human authentication module 208*a*-1. The module 208*a*-1 may include one or more devices/sensors, such as, for example, a programmable camera (which may be operative in conjunction with facial or hand scanning/recognition algorithms), a microphone (which may be operative in conjunction with voice recognition technology/algorithms), a biometric sensor (e.g., a retinal scanning device, a breathalyzer, a fingerprint scanner, a thermometer, etc.). The module 208*a*-1 may receive inputs that are indicative of (physical qualities/characteristics of) the user that is allegedly playing in the game. Those inputs may be compared against a database/library of physical characteristics that are stored for the user (e.g., potentially as part of the module 204*a*-1 described above). The comparison may yield/generate one or more values that may be compared against one or more thresholds in order to determine whether it is likely/probable that the user that is allegedly playing the game is actually the person playing the game.

In some embodiments, the module 208*a*-1 may include a multi-party detection module. The multi-party detection module may examine/analyze physical characteristics and/or behaviors/responses to stimuli (e.g., patterns in terms of actuation of input devices in response to game scenarios) presented during gameplay to determine whether it is likely/probably that a user that is allegedly playing in the game is receiving unauthorized/illegal assistance from one or more additional users. The determination may be based on a comparison with one or more of the models/specifications/profiles generated in connection with the behavior learning module 204*a* described above.

The validation module 208*a* may include a digital and environment module 208*a*-2 that may be used to ensure that a user has not tampered with the system hardware, software, or firmware. For example, the module 208*a*-2 may perform one or more checks against the game engine 3 to ensure that the game engine 3 is not tampered with during gameplay. Additionally, the module 208*a*-2 may monitor network traffic to identify abnormalities in terms of patterns or volumes/amounts of data traversing a network. The validations/checks performed by the module 208*a*-2 may be based on a comparison of one or more parameters with one or more thresholds.

In some embodiments, the validation module 208*a* may correlate activities of the game engine 3 with user inputs. For example, the module 208*a* may validate controllers used in connection with gameplay based on the correlation of such activities.

In some embodiments, the validation module 208*a* (e.g., the human authentication module 208*a*-1) may examine outputs of a user-facing camera (e.g., a pan-tilt-zoom (PTZ) camera) to correlate physical movements of a user with gameplay.

In some embodiments, the validation module 208*a* (the human authentication module 208*a*-1) may include an audio sensor that may compare a voice input to a voice baseline/signature (e.g., to detect impersonation or a mid-game player/user swap).

In some embodiments, models established for one or more users or applications (e.g., games), potentially as part of the behavior learning module 204*a*, may be adapted as additional inputs are received (potentially in conjunction with the validation module 208*a*). In this respect, the system 200*a* may incorporate aspects of machine learning in order to enhance the accuracy of correlating user based/derived inputs relative to expected/anticipated user inputs. Thus, increased use/operation of the system 200*a* may increase the integrity/confidence associated with the gameplay. Stated slightly differently, increased use/operation of the system 200*a* may make it more difficult to cheat or engage in fraud in conjunction with the system 200*a* (all other conditions being equal).

In some embodiments, the validation module 208*a* (e.g., the digital and environment module 208*a*-2) may generate one or more prompts/requests if suspicious activity is detected. For example, unknown or unusual interactions (e.g., innocuous appearing icons or bots) may be generated that a human might normally dismiss but a pre-trained fraud detection circumvention model may not know how to counteract. In some embodiments, aspects of a captcha or a two-factor authentication (2FA) technique may be implemented by the validation module 208*a*. The validation module 208*a* may present one or more queries to which a user is expected to furnish/provide a response.

In some embodiments, validation performed by the validation module 208*a* may be performed in response to one or more particular events (e.g., a start of a game, an end/conclusion of a game, detection of suspicious activity). In some embodiments, the validation performed by the validation module 208a may be performed in response to a user request (e.g., at the request of a moderator/proctor or another user). The validation may be performed as part of an audit, potentially as part of certifying results of the game.

The system 200a may include the counter-measures module 212a to engage counter-measures in response to detecting suspicious activity. The module 212a may include a detection prioritization module for prioritizing which activities to monitor. The detection prioritization module may allocate resources amongst activities or users in accordance with one or more algorithms. For example, if a winner of a first game receives a prize or other compensation and a winner of a second game does not receive a prize or compensation, more resources may be allocated towards monitoring the gameplay associated with the first game relative to the second game given the incentives involved. Still further, if a particular user or game has a history/historical record of suspicious activities in association therewith, more resources may be allocated to that user or game accordingly. Priority or frequency of detection/examination may be controlled/regulated as behaviors approach an anomalous condition.

The counter-measure module 212a may include a fraud notification module. The fraud notification module may select a type of technique for communication fraud or other types of suspicious activities. For example, the fraud notification module may communicate with one or more devices or users regarding a status of activities monitored during gameplay. The notification(s) provided by the fraud notification module may include communications in one or more formats, such as, for example, an email, a text message, a text report, a graphical indication (e.g., an emoji or emoticon), an audio alert, a video, etc.

The counter-measures module 212a may provide control (e.g., remote control) of one or more capture sensors. For example, responsive to a detection of suspicious activities, the counter-measures module 212a may direct a camera, a microphone, a biometric sensor, etc., to collect (additional) data regarding a particular user or an environment in which the particular user is located. In some embodiments, the control of the sensors/devices may be passive in the sense that the user might be unaware of the existence of the sensor and/or might be unaware that the sensors/devices are active/enabled. In some embodiments, the sensors/devices may engage in integrity tests/validations of one or more devices or pieces of equipment; for example, a piece of equipment may be required to respond with a dynamic/adaptive password in response to one or more challenge questions/queries. In some embodiments, an automated checksum on in-memory assets (including a functional input/output test) may be performed, and a scan may be performed for a modified device (e.g., a modified keyboard, mouse, haptic device, etc.). In some embodiments, integrity tests may be performed on one or more components, where the integrity checks might not be based on user feedback/inputs. One or more results associated with an integrity test may be analyzed and/or provided to another device (e.g., a server) for analysis.

In some embodiments, the counter-measures module 212a may alert and/or poll additional users and/or proctors/moderators when the activities of a first user are suspect. In this manner, a wisdom-of-the-crowds approach may be used to determine a likelihood/probability that a user is indeed engaging in unauthorized/illegal activities.

The counter-measures module 212a may propose validation requests (potentially to be carried out/executed by the validation module 208a), which may require user interaction, in response to a detection of suspicious activities. For example, simple problems (e.g., math, captcha) or 2FA techniques may be used. In some embodiments, a polygraph may be administrated with specific questions particular to a user's history. Biometric validation techniques may be recommended. Visual or audio content may be presented that require user responses.

The counter-measures module 212a may impose one or more penalties in response to detecting suspicious activities (e.g., fraud) and/or in response to confirming that the suspicious activities are improper/unauthorized. For example, a restriction/limitation may be applied to gameplay, resulting in a reduction in gameplay capabilities. In some embodiments, a user's ability to engage in communication (within a game environment, as part of a social media platform, etc.) may be restricted/limited. In some embodiments, a sanction (e.g., a public shaming) may be imposed, such as, for example, a transmission and/or a posting of a message on a social media platform that identifies the user(s) and/or games/applications. The amount of time that the user is penalized or sanctioned may be a function of the activity that the user engaged in.

The post-mortem module 216a may be used to adjust models (e.g., statistical models) and record activities for subsequent review. For example, a record may be generated (potentially as part of a model established for a user via the module 204a) that documents/logs suspicious activity for, e.g., purposes of future monitoring/detection.

Figure 2B:
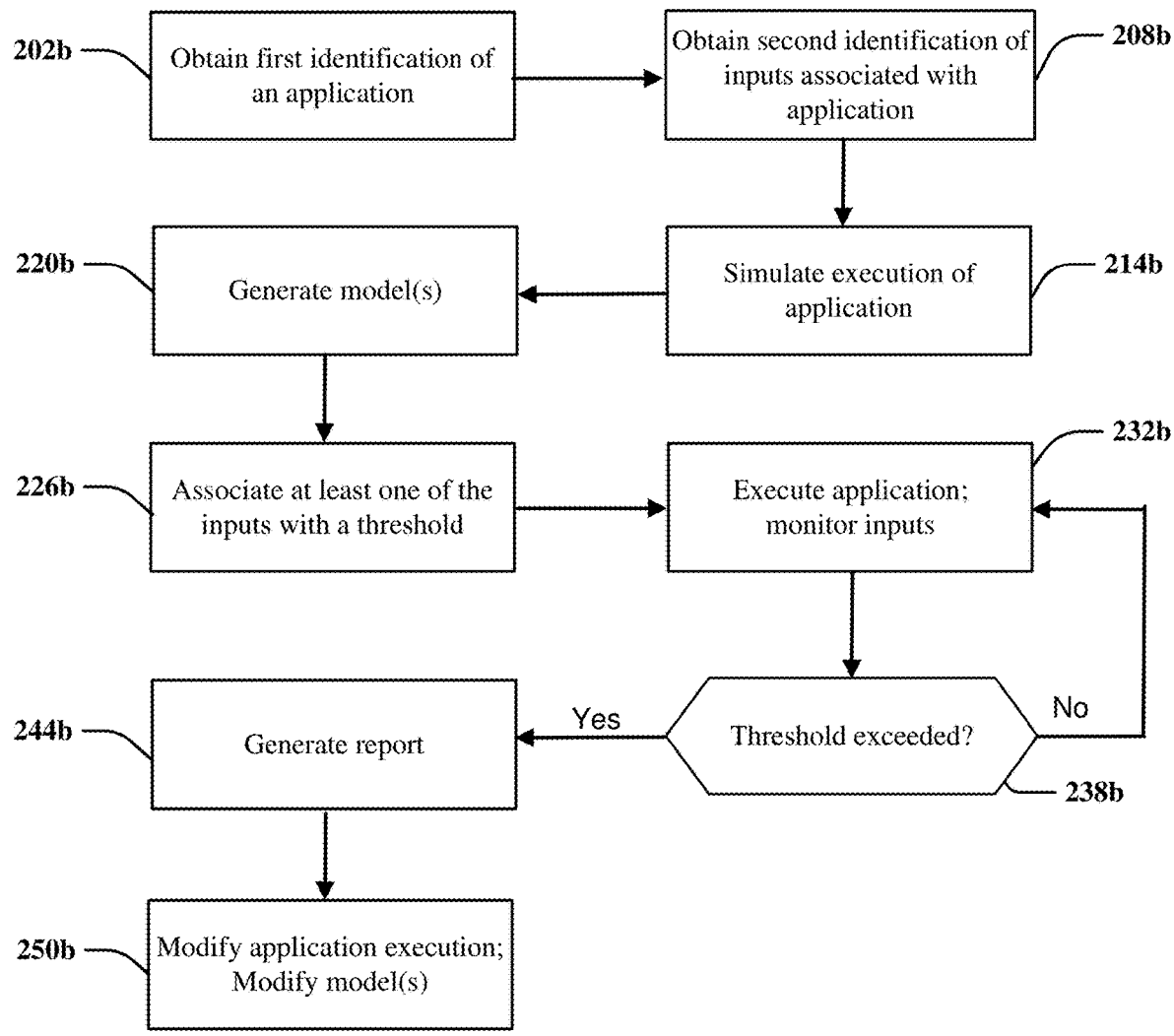
FIGS. 2B-2C depict illustrative embodiments of methods in accordance with various aspects described herein.

FIG. 2B depicts an illustrative embodiment of a method 200b in accordance with various aspects described herein. The method 200b may be at least partially executed in conjunction with one or more systems, devices, or components, such as, for example, the systems, devices, and components described herein. The method 200b may be executed for purposes of tracking and documenting activities of a user during an execution of an application. For example, the method 200b may be used to record suspicious activities that a user may engage in during gameplay associated with a game.

In block 202b, an identification (e.g., a first identification) of an application may be obtained. For example, the identification obtained in block 202b may correspond to a title of a game, an alphanumeric code, and the like. The identification obtained in block 202b may uniquely distinguish the application from other applications.

In block 208b, an identification (e.g., a second identification) may be obtained. The identification obtained in block 208b may correspond to, or include, an identification of devices that are used in conjunction with an execution of the application identified in block 202b. In this respect, the identification obtained in block 208b may be based on the identification obtained as part of block 202b. As an illustrative example, if the application referred to in block 202b corresponds to a game, the identification obtained in block 208b may correspond to an identification of one or more networks, consoles, and/or peripheral devices that may be used to play the game.

In block 214b, execution of the application may be simulated (potentially as part of one or more training or trial-runs). Continuing the above example, if the application corresponds to a game, the simulation of block 214b may present a user playing the game with various in-game scenarios/stimuli that the user is expected to respond to. The simulation of block 214b may cause the user to actuate/ exercise one or more devices (e.g., peripheral devices) that may be identified as part of block 208b described above. The simulation of block 214b may pertain to one or more users.

In block 220b, one or more models may be generated for the user(s) that engaged in the simulation associated with block 214b. For example, a model may include a specification/mapping of stimuli presented during the simulation to user responses to the stimuli. The model may include an indication of devices exercised/actuated in response to the stimuli, response times to the presentation of the stimuli, etc. A model generated in block 220b may be specific to a particular user (such that a unique user identifier may be used in connection with each model), a particular device, etc. In some embodiments, a model generated in block 220b for a particular user may be at least partially based on a preexisting model for that user (potentially in conjunction with one or more other applications). In some embodiments, as part of block 220b a model may be generated that is representative of a plurality of users, a plurality of devices, and/or a plurality of networks.

In block 226b, one or more of the inputs (identified as part of block 208b) may be associated with one or more thresholds. Values for the threshold(s) may be established based on the model(s) generated as part of block 220b. For example, if a first user demonstrates during a first simulation (of block 214b) that the first user is very skilled/talented in using a peripheral device, a first threshold value may be established for the first user for that peripheral device. Similarly, if a second user demonstrates during a second simulation (of block 214b) that the second user is not skilled/talented in using the peripheral device, a second threshold value may be established for the second user for that peripheral device, where the second threshold value is different from the first threshold value. While shown as a separate block in FIG. 2B, the association of the threshold values with the input(s) in block 226b may be included as part of block 220b in some embodiments.

In block 232b, the application may be executed. Continuing the above example, if the application corresponds to a game, the game may actually be played. Inputs/behaviors/responses may be monitored during the execution of the application to identify activities (e.g., suspicious activities).

In block 238b, a determination may be made whether the monitored inputs of block 232b exceed the threshold(s) established in block 226b. If the threshold(s) is/are not exceeded (e.g., the "no" path is taken from block 238b), flow may proceed from block 238b to block 232b to continue monitoring the inputs. On the other hand, if the threshold(s) is/are exceeded (e.g., the "yes" path is taken from block 238b), flow may proceed from block 238b to block 244b.

In block 244b, a report may be generated that documents, e.g., the value(s) of the input(s) that are detected/monitored as part of block 232b, one or more identifications (e.g., a third identification) of the user(s) supplying/providing those input(s), the stimuli that was presented during the execution of the application that elicited that/those input(s), and any other details that may be pertinent to examining/analyzing the activities of the user(s). As part of block 244b, one or more alerts may be generated to inform, e.g., a moderator/proctor (or any other person or device) of the existence of suspicious activity.

In block 250b, execution of the application may be modified based on the determination/detection that the threshold(s) was/were exceeded as part of block 238b. For example, and as described above, a penalty or sanction may be imposed on the user(s) depending on the nature of the activities that the user(s) engaged in. In some embodiments, the user(s) and/or the hardware, software, or firmware used by the user(s) may be subject to one or more of the validations/tests described herein as part of block 250b. For example, the user(s) and/or devices/user equipment may have to pass a test in order to continue playing in a game. As part of block 250b, one or more of the models generated as part of block 220b may be modified in accordance with the input(s) of block 232b.

Figure 2C:
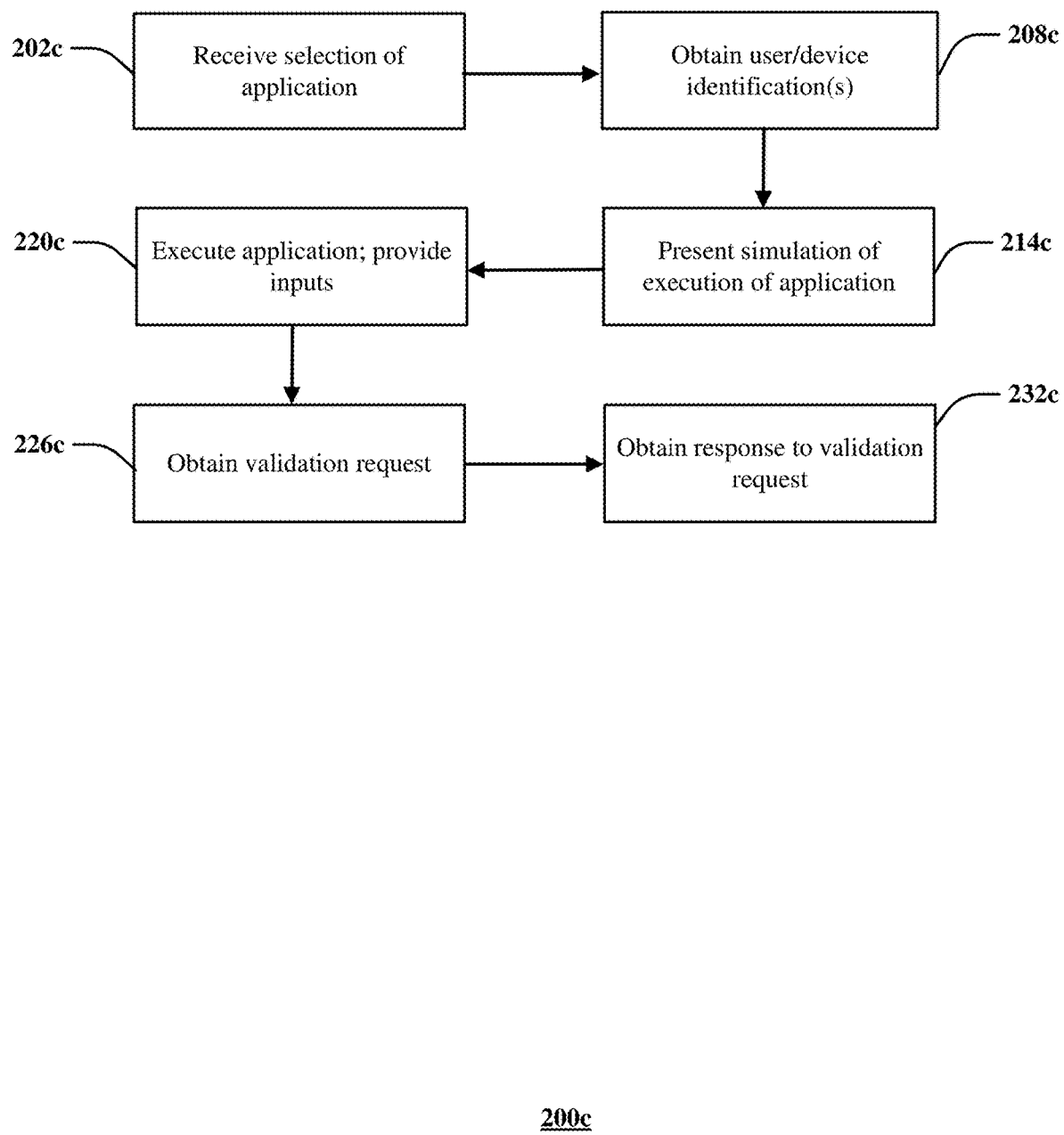

FIG. 2C depicts an illustrative embodiment of a method 200c in accordance with various aspects described herein. The method 200c may be at least partially executed in conjunction with one or more systems, devices, or components, such as, for example, the systems, devices, and components described herein. The method 200c may be executed for purposes of tracking and documenting activities of a user during an execution of an application. For example, the method 200c may be used to establish whether one or more users or devices are engaging in particular activities during gameplay associated with a game. If such activities are detected, the method 200c may be used to validate a user or device as appropriate under the circumstances.

In block 202c, a selection of an application may be received. For example, the selection of block 202c may pertain to or identify a particular application from a plurality of applications.

In block 208c, one or more identifiers/identifications may be obtained. The identifications of block 208c may pertain to one or more users and/or one or more devices. The identifications of block 208c may be based on the selected application of block 202c. The identifications of block 208c may include one or more of a username and password, a personal identification number (PIN), a make, model, and/or serial number associated with a device, etc.

In block 214c, a simulation of an execution of the selected application may be presented. For example, and assuming that the selected application pertains to a game, the simulation of block 214c may present a user playing the game with various in-game scenarios/stimuli that the user is expected to respond to. The simulation of block 214c may cause the user to actuate/exercise one or more devices (e.g., peripheral devices) that may be identified as part of block 208c described above. The simulation of block 214c may facilitate the generation of one or more models as described above.

In block 220c, the application selected as part of block 202c may be executed. For example, in the context of a game the application may be executed to facilitate gameplay amongst one or more users/players/gamers. Execution of the application may entail/include presenting one or more in-game scenarios/stimuli and receiving inputs (e.g., user inputs, device inputs, etc.) in response to that stimuli. As part of block 220c, the inputs may be provided (e.g., transmitted) to, e.g., a server or other device for further analysis. In some embodiments, the inputs may be analyzed locally (e.g., as part of one or more algorithms executed by a user device, a gaming console, etc.).

In block 226c, a validation request may be obtained. For example, the validation request may be received or generated periodically. The validation request may be received or generated based on the execution of the application and the inputs received as part of block 220c. For example, the validation requests may be generated based on the inputs suggesting that suspicious activity may be afoot/in-progress. The validation request may pertain to one or more users and/or one or more devices.

In block 232c, a response to the validation requested may be obtained (e.g., received or generated). As part of block 232c, the response may be provided (e.g., transmitted) to, e.g., a server or other device for further analysis.

While for purposes of simplicity of explanation, the respective processes are shown and described as a series of blocks in FIGS. 2B-2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. While the methods 200b and 200c are shown separately for the sake of illustrative convenience, in some embodiments one or more aspects of a first of the methods may be combined with one or more aspects of the other of the methods.

Aspects of the disclosure may be used to monitor (e.g., passively and/or actively monitor) user behavior. For example, in the context of a game (e.g., an online, multi-player video game), user behaviors and in-game actions may be monitored to detect suspicious activities and counteract those activities as warranted/desired. Aspects of the disclosure may establish and rely upon data-driven baselines that can be reused when new/additional game scenarios are created/encountered. For example, baseline behaviors and input models may be generated passively by observing/analyzing live and historical gameplay records. Automated and semi-automated strategies may be adopted to validate users and user behaviors. For example, multiple types of suspicious (e.g., fraudulent) activities may be detected/identified and counter-measures may be engaged for responding to the identified activities. Learned behaviors in a first environment (e.g., a first game) may be leveraged/applied to additional environment (e.g., additional games), providing for a high degree of reusability and robustness, thereby reducing training/simulation time and providing many points of comparison for users, activities, etc.

Aspects of this disclosure may be used to detected suspicious (e.g., fraudulent) activities, potentially in relation to complex human-machine interactions. Aspects of the disclosure may be applied in connection with one or more signaling domains; for example, aspects of the disclosure may be applied in connection with analog signals, digital signals, etc. Based on machine learning, user inputs/behaviors in response to stimuli may be recorded and may serve as a basis for comparison in response to future events/stimuli.

Aspects of the disclosure may be applied to track resources/assets of a game and users/players of a game. Aspects of the disclosure may provide remote control over such assets or users, potentially in accordance with one or more teleoperation techniques.

In some embodiments, gameplay may be adapted based on detecting suspicious activities. For example, in the context of a game involving war/battles, if a user has been detected as operating a weapon (e.g., a cannon) at abnormally high rates of speed, that user may only be presented with in-game scenarios that make the use of the weapon impractical. In this manner, the user's ability to engage in unfair activities may be restricted without necessarily accusing the user of wrong-doing.

Aspects of the disclosure may be used to create/generate a marketplace where incremental automated modules or models may be adapted and sold for use/application in connection with one or more games. In some embodiments, player behavior models/signatures may be created/generated as part of a tutorial to assist novice gamers in developing their skills. In this manner, expert users can effectively teach or coach beginner users.

While some of the examples described herein pertain to gaming applications (such as, for example, electronic sports or eSports), aspects of the disclosure may be applied in connection with other application environments. For example, aspects of the disclosure may be applied in connection with voting applications, test taking applications, banking/finance applications, etc.

In some embodiments, a distributed ledger may be utilized to reconcile or validate user activities/behaviors. For example, blockchain technology may be utilized where a given activity/transaction may be verified/validated in accordance with a plurality of computing devices.

Aspects of the disclosure may incorporate X reality (XR) or cross reality technologies. As one skilled in the art will appreciate, XR or cross reality is a form of a mixed reality environment that comes from a fusion/union of ubiquitous sensor/actuator networks and shared online virtual worlds. XR technology may incorporate a wide spectrum of hardware, software, and/or firmware, and may include one or more sensory interfaces, applications, and/or infrastructures, that enable content creation/generation/provisioning for virtual reality (VR), augmented reality (AR), cinematic reality (CR), or a combination thereof. XR technology may be used to generate new or alternative forms of reality by incorporating objects (e.g., digital objects) into the physical world and may bring physical objects into the digital world. In this respect, XR technology may incorporate aspects of a mixed reality (MR), where traditional dividing lines between the physical world and the digital world are blended, obscured, or even eliminated. XR technology may incorporate visual/image data, audio data, or a combination thereof.

Figure 2D:
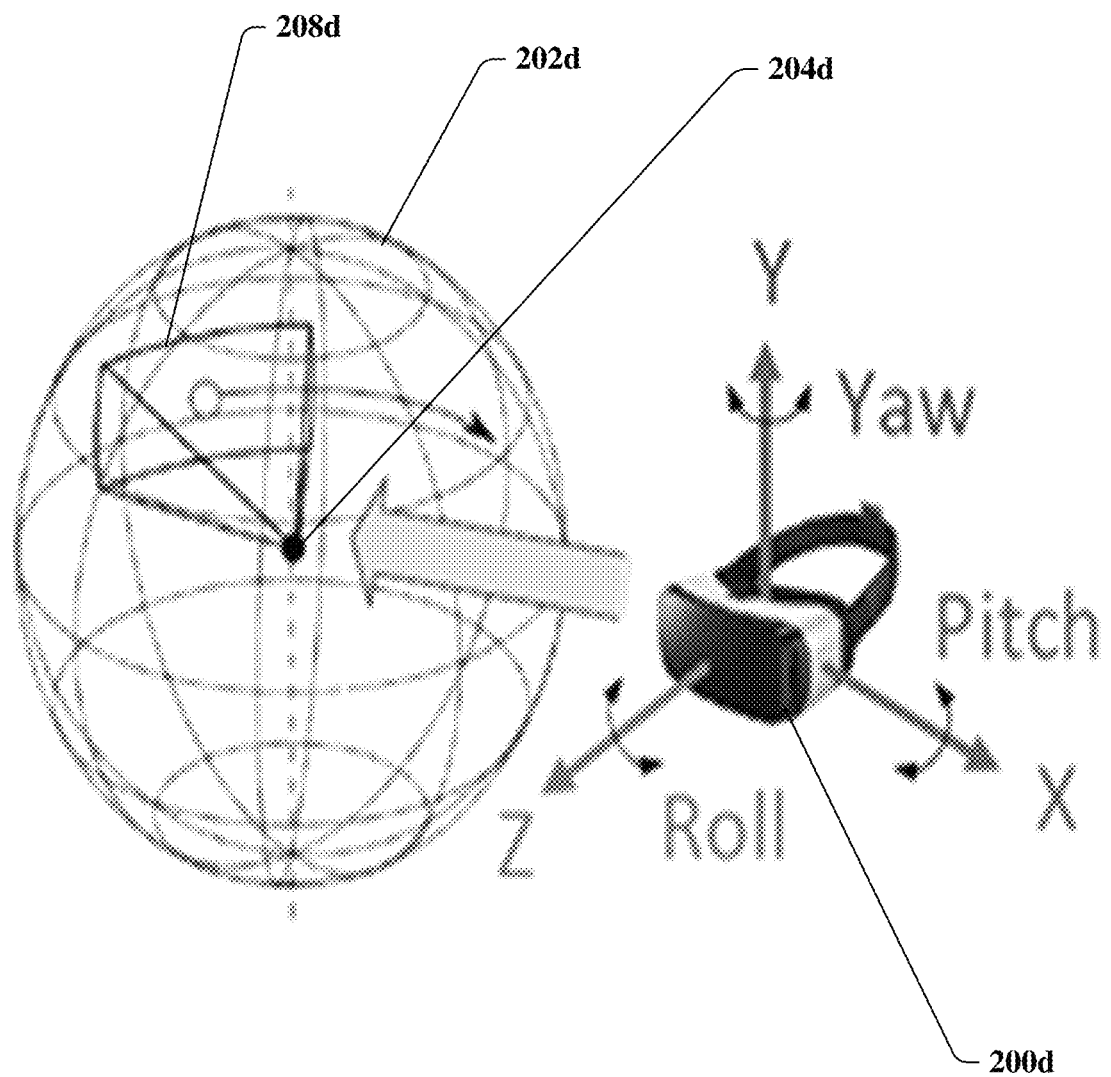
FIG. 2D depicts an illustrative embodiment of a user device in accordance with aspects described herein.

Aspects of the disclosure may be implemented in conjunction with one or more devices, such as, for example, network elements, servers, user devices, etc. For example, FIG. 2D is a block diagram illustrating a non-limiting embodiment of a headset 200d functioning as a user device in accordance with various aspects described herein. The headset 200d may be used to present one or more objects in accordance with XR technology. In some embodiments, the objects may be presented in conjunction with panoramic content (e.g., 360-degree videos).

Panoramic content may be recorded by omnidirectional cameras or camera array systems, and then "wrapped" onto at least a portion of a three-dimensional (3D) sphere (e.g., 3D sphere 202d), with the cameras at or proximate a center 204d of the sphere. When watching a panoramic video, a user/viewer at the spherical center 204d can freely control her viewing direction, so each playback may create a unique viewing experience. The control of viewing directions may be achieved through, e.g., head movement when using a head-mounted device, hand/finger movement when using a mobile/portable communication device (e.g., a phone or a tablet), a mouse click when using a laptop or desktop computer, or use of a remote control or trackball when using a display device such as a television. Other techniques, such as, for example, gesture recognition, may be used. One or more combinations of the controls described above may be used.

As shown in FIG. 2D, a headset 200d can be used to adjust a viewing orientation by changing the pitch, yaw, and/or roll, which correspond to movement (e.g., rotation) along the super-imposed X, Y, and Z axes, respectively. The headset 200d may support operations in accordance with six degrees/dimensions of freedom. For example, the X, Y, and Z axes collectively represent three dimensions of freedom, and movement along any one of the axes (e.g., in a plus or minus direction) represents another degree/dimension of freedom.

Panoramic video and game players may compute and display the viewing area based on the viewing orientation and the field of view (FoV). The FoV defines the extent of an observable area 208d, which may be a fixed or dynamic parameter of the headset 200d. In an illustrative embodiment, the observable area 208d may be 110° horizontally (+/−10%) and 90° vertically (+/−10%). Other values of the observable area 208d may be used in some embodiments, where the values may be dependent on an application that is being simulated or executed.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of the system 200a, the method 200b, and the method 200c, and the subsystems and functions of the device 200d presented in FIGS. 1-2D. For example, virtualized communication network 300 can facilitate in whole or in part obtaining a first identification of a gaming application, obtaining a second identification of at least one peripheral device associated with an execution of the gaming application, wherein the second identification is based on the first identification, associating the second identification of the at least one peripheral device with a threshold, monitoring at least one input received from the at least one peripheral device during the execution of the gaming application to determine whether the at least one input exceeds the threshold, and responsive to determining that the at least one input exceeds the threshold, storing a third identification of a user in association with the at least one input. Virtualized communication network 300 can facilitate in whole or in part receiving a selection of an application included in a plurality of applications, obtaining a first identification of a user and a second identification of a device associated with an execution of the application, presenting a simulation of an execution of the application to facilitate a generation of a model associated with the first identification and the second identification, executing the application subsequent to the presenting of the simulation, receiving at least one input from the device during the executing of the application, and obtaining a validation request based on a comparison of the at least one input and the model. Virtualized communication network 300 can facilitate in whole or in part comparing an input received from a peripheral device associated with an execution of a gaming application with a threshold value, wherein the threshold value is based on a first identification of a first user, a second identification of the peripheral device, and a third identification of stimuli presented as part of the execution of the gaming application, responsive to the comparing, determining that the input exceeds the threshold value, and responsive to the determining, transmitting, a validation request to a user device of the first user.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
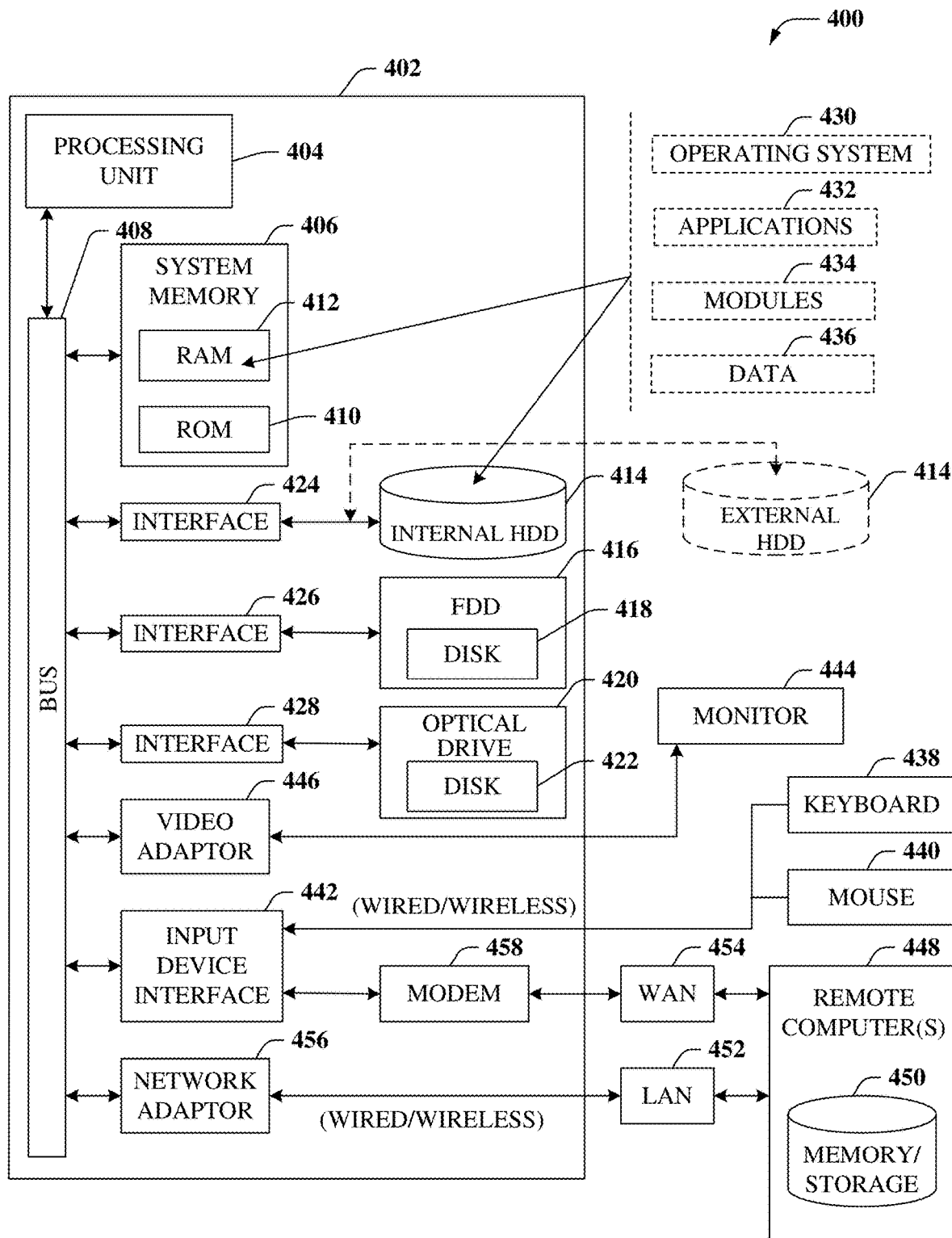
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a first identification of a gaming application, obtaining a second identification of at least one peripheral device associated with an execution of the gaming application, wherein the second identification is based on the first identification, associating the second identification of the at least one peripheral device with a threshold, monitoring at least one input received from the at least one peripheral device during the execution of the gaming application to determine whether the at least one input exceeds the threshold, and responsive to determining that the at least one input exceeds the threshold, storing a third identification of a user in association with the at least one input. Computing environment 400 can facilitate in whole or in part receiving a selection of an application included in a plurality of applications, obtaining a first identification of a user and a second identification of a device associated with an execution of the application, presenting a simulation of an execution of the application to facilitate a generation of a model associated with the first identification and the second identification, executing the application subsequent to the presenting of the simulation, receiving at least one input from the device during the executing of the application, and obtaining a validation request based on a comparison of the at least one input and the model. Computing environment 400 can facilitate in whole or in part comparing an input received from a peripheral device associated with an execution of a gaming application with a threshold value, wherein the threshold value is based on a first identification of a first user, a second identification of the peripheral device, and a third identification of stimuli presented as part of the execution of the gaming application, responsive to the comparing, determining that the input exceeds the threshold value, and responsive to the determining, transmitting, a validation request to a user device of the first user.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, for example, or with products that contain both bands (dual band), so the networks can provide real-world performance similar to the basic 10BaseT wired Ethernet networks used in many offices.

Figure 5:
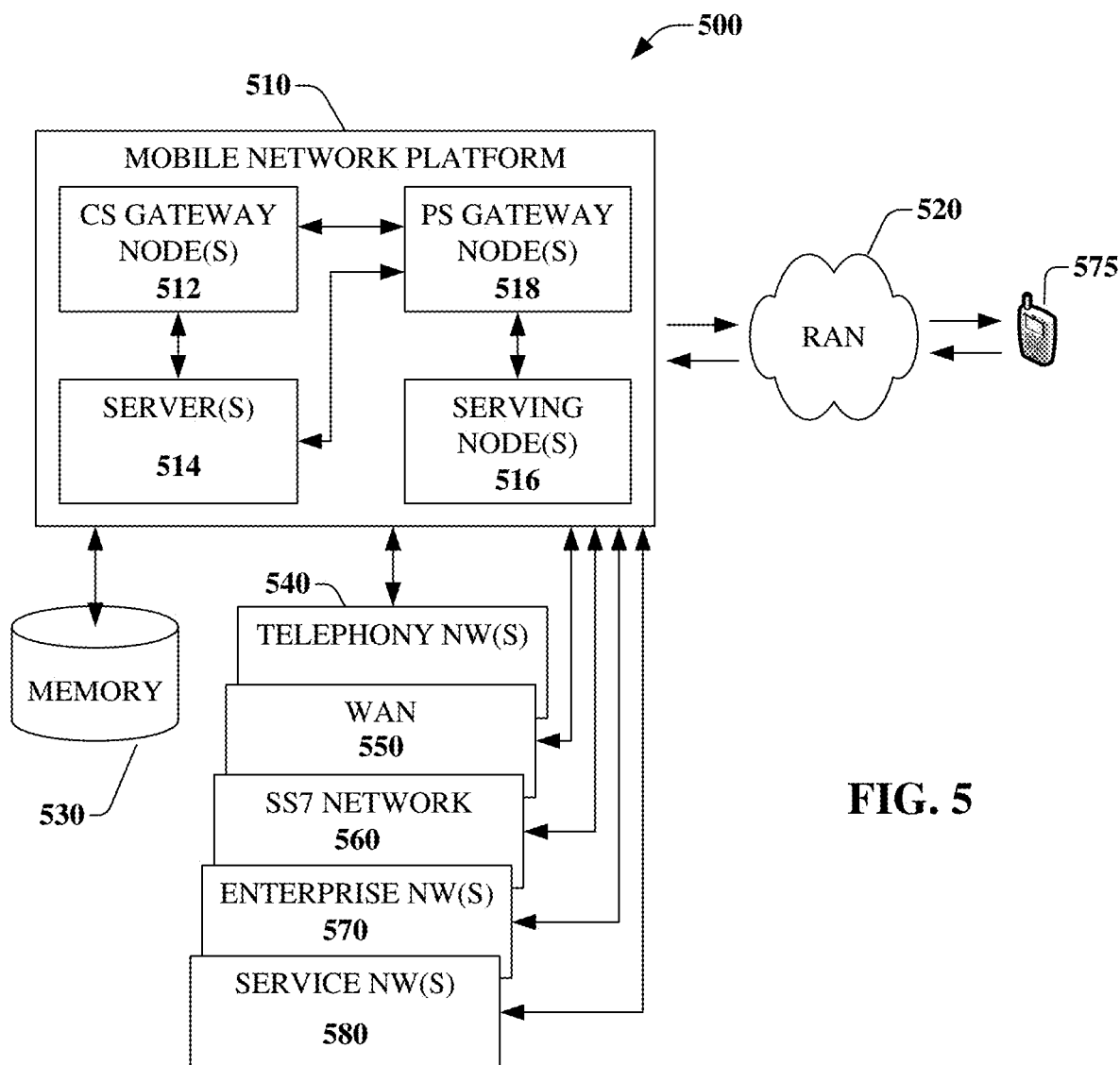
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a first identification of a gaming application, obtaining a second identification of at least one peripheral device associated with an execution of the gaming application, wherein the second identification is based on the first identification, associating the second identification of the at least one peripheral device with a threshold, monitoring at least one input received from the at least one peripheral device during the execution of the gaming application to determine whether the at least one input exceeds the threshold, and responsive to determining that the at least one input exceeds the threshold, storing a third identification of a user in association with the at least one input. Platform 510 can facilitate in whole or in part receiving a selection of an application included in a plurality of applications, obtaining a first identification of a user and a second identification of a device associated with an execution of the application, presenting a simulation of an execution of the application to facilitate a generation of a model associated with the first identification and the second identification, executing the application subsequent to the presenting of the simulation, receiving at least one input from the device during the executing of the application, and obtaining a validation request based on a comparison of the at least one input and the model. Platform 500 can facilitate in whole or in part comparing an input received from a peripheral device associated with an execution of a gaming application with a threshold value, wherein the threshold value is based on a first identification of a first user, a second identification of the peripheral device, and a third identification of stimuli presented as part of the execution of the gaming application, responsive to the comparing, determining that the input exceeds the threshold value, and responsive to the determining, transmitting, a validation request to a user device of the first user.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology/technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
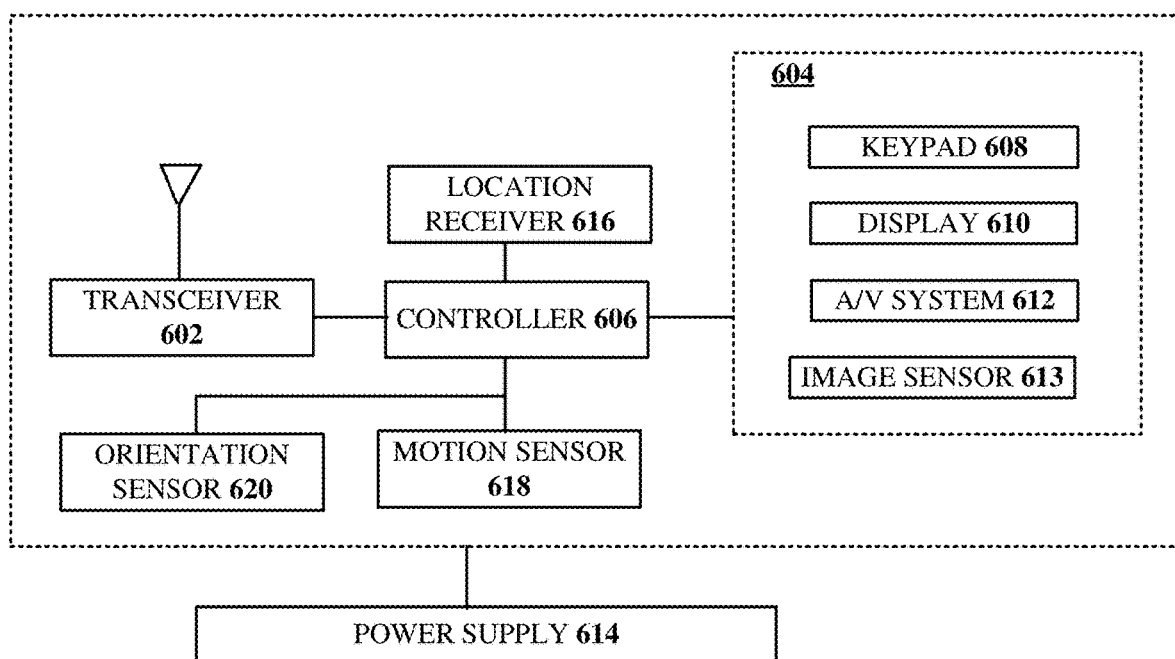
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a first identification of a gaming application, obtaining a second identification of at least one peripheral device associated with an execution of the gaming application, wherein the second identification is based on the first identification, associating the second identification of the at least one peripheral device with a threshold, monitoring at least one input received from the at least one peripheral device during the execution of the gaming application to determine whether the at least one input exceeds the threshold, and responsive to determining that the at least one input exceeds the threshold, storing a third identification of a user in association with the at least one input. Computing device 600 can facilitate in whole or in part receiving a selection of an application included in a plurality of applications, obtaining a first identification of a user and a second identification of a device associated with an execution of the application, presenting a simulation of an execution of the application to facilitate a generation of a model associated with the first identification and the second identification, executing the application subsequent to the presenting of the simulation, receiving at least one input from the device during the executing of the application, and obtaining a validation request based on a comparison of the at least one input and the model. Computing device 600 can facilitate in whole or in part comparing an input received from a peripheral device associated with an execution of a gaming application with a threshold value, wherein the threshold value is based on a first identification of a first user, a second identification of the peripheral device, and a third identification of stimuli presented as part of the execution of the gaming application, responsive to the comparing, determining that the input exceeds the threshold value, and responsive to the determining, transmitting, a validation request to a user device of the first user.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting, for example, Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining a first identification of a gaming application associated with a game;
obtaining a second identification of at least one peripheral device associated with an execution of the gaming application, wherein the second identification is based on the first identification;
associating the second identification of the at least one peripheral device with a threshold;
monitoring at least one input received from the at least one peripheral device during the execution of the gaming application to determine whether the at least one input exceeds the threshold;

responsive to determining that the at least one input exceeds the threshold, storing a third identification of a user in association with the at least one input; and responsive to determining that the threshold is exceeded, modifying an execution of the gaming application, wherein the modifying of the execution of the gaming application causes the at least one input not to exceed the threshold when the user plays in the game subsequent to the at least one input exceeding the threshold.

2. The device of claim 1, wherein the operations further comprise:

establishing a model of the execution of the gaming application based on a simulation of the gaming application; and establishing a value for the threshold based on the model.

3. The device of claim 2, wherein the operations further comprise:

associating the model with the third identification of the user.

4. The device of claim 2, wherein the operations further comprise:

modifying the model based on the at least one input to generate a modified model; and applying the modified model during a subsequent execution of the gaming application to determine whether the at least one input exceeds a second threshold that is different from the threshold.

5. The device of claim 1, wherein the operations further comprise:

presenting a validation request.

6. The device of claim 5, wherein the presenting of the validation request comprises presenting the validation request to the user, and wherein the operations further comprise:

receiving a response to the validation request from the user.

7. The device of claim 5, wherein the presenting of the validation request comprises presenting the validation request to a component of the device, and wherein the operations further comprise:

receiving a response to the validation request from the component, wherein the response to the validation request is not based on user input.

8. The device of claim 5, wherein the presenting of the validation request is responsive to determining that the at least one input exceeds the threshold.

9. The device of claim 5, wherein the presenting of the validation request causes an activation of a sensor that monitors the user, an environment where the user is located, or a combination thereof.

10. A non-transitory, machine-readable medium, comprising executable instructions that, when executed by a processing system including a processor, facilitate performance of operations, the operations comprising:

receiving a selection of an application included in a plurality of applications;

obtaining a first identification of a first user and a second identification of a device associated with an execution of the application;

presenting a simulation of an execution of the application to generate a model;

associating the model with the first identification and the second identification;

executing the application subsequent to the presenting of the simulation;

receiving at least one input from the device during the executing of the application;

responsive to the receiving of the at least one input, obtaining a validation request based on a comparison of the at least one input and the model;

responsive to the receiving of the at least one input, polling a second user and a third user; and determining a probability that the first user is engaging in an unauthorized activity based on the polling.

11. The non-transitory, machine-readable medium of claim 10, wherein the application is one of a gaming application, a voting application, a test taking application, or a finance application.

12. The non-transitory, machine-readable medium of claim 10, wherein the operations further comprise:

presenting the validation request to the first user; and receiving a response to the validation request from the first user.

13. The non-transitory, machine-readable medium of claim 10, wherein the operations further comprise:

causing an activation of at least one sensor responsive to obtaining the validation request, wherein the at least one sensor comprises a camera, a microphone, a biometric sensor, or a combination thereof.

14. The non-transitory, machine-readable medium of claim 10, wherein the operations further comprise:

performing an integrity test on a component of the device responsive to obtaining the validation request; and transmitting a result associated with the performing of the integrity test to a server, wherein the component is included in a gaming console, a peripheral device coupled to the gaming console, or a combination thereof, and wherein the validation request is based on a probability of cheating by a macro, hacked code, or software assistance exceeding a threshold.

15. A method, comprising:

comparing, by a processing system including a processor, an input received from a peripheral device associated with an execution of a gaming application with a threshold value, wherein the threshold value is based on a first identification of a first user, a second identification of the peripheral device, and a third identification of stimuli presented as part of the execution of the gaming application;

responsive to the comparing, determining, by the processing system, that the input exceeds the threshold value;

responsive to the determining, transmitting, by the processing system, a validation request to a user device of the first user;

responsive to the comparing, identifying, by the processing system, a second user that likely generated the input received from the peripheral device, wherein the identifying of the second user is based on a model generated during at least one simulation of the execution of the gaming application in which the first user and the second user participated; and transmitting, by the processing system, a message on a social media platform that identifies the first user and the second user in association with the execution of the gaming application.

16. The method of claim 15, wherein the user device is coupled to the peripheral device, the method further comprising:

receiving, by the processing system, a response to the validation request, wherein the response comprises data originating from a sensor that monitors the first user, an environment where the first user is located, or a combination thereof, wherein the response comprises user feedback, and wherein the user feedback is based on a query included in the validation request.

17. The non-transitory, machine-readable medium of claim 10, wherein the operations further comprise:
responsive to the receiving of the at least one input, limiting an ability of the first user to engage in communication during the executing of the application.

18. The non-transitory, machine-readable medium of claim 10, wherein the operations further comprise:
monitoring traffic in a network; and
identifying, in accordance with the monitoring of the traffic, an abnormality in terms of a pattern or volume of data traversing the network exceeding a threshold.

19. The non-transitory, machine-readable medium of claim 10, wherein the determining of the probability that the first user is engaging in an unauthorized activity comprises determining a probability that the first user is receiving unauthorized assistance from a fourth user.

20. The non-transitory, machine-readable medium of claim 10, wherein the operations further comprise:
responsive to the receiving of the at least one input, transmitting a message that causes a posting on a social media platform, wherein the posting identifies the first user and the application.

\* \* \* \* \*